(12) United States Patent
Namba

(10) Patent No.: US 10,917,910 B2
(45) Date of Patent: *Feb. 9, 2021

(54) RADIO TERMINAL APPARATUS, RADIO BASE STATION APPARATUS, MOBILITY MANAGEMENT APPARATUS, RADIO TRANSMISSION METHOD, RADIO COMMUNICATION METHOD, AND MOBILITY MANAGEMENT METHOD

(71) Applicants: SHARP KABUSHIKI KAISHA, Sakai (JP); FG INNOVATION COMPANY LIMITED, Tuen Mun (HK)

(72) Inventor: Hideo Namba, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/310,377

(22) PCT Filed: Jun. 28, 2017

(86) PCT No.: PCT/JP2017/023794
§ 371 (c)(1),
(2) Date: Dec. 14, 2018

(87) PCT Pub. No.: WO2018/003875
PCT Pub. Date: Jan. 4, 2018

(65) Prior Publication Data
US 2019/0335494 A1 Oct. 31, 2019

(30) Foreign Application Priority Data

Jun. 30, 2016 (JP) .................................. 2016-129854
Jun. 30, 2016 (JP) .................................. 2016-129855
Jun. 30, 2016 (JP) .................................. 2016-129856

(51) Int. Cl.
*H04W 72/14* (2009.01)
*H04L 5/00* (2006.01)
(Continued)

(52) U.S. Cl.
CPC ............ *H04W 72/14* (2013.01); *H04L 5/0055* (2013.01); *H04W 8/08* (2013.01); *H04W 76/11* (2018.02); *H04W 76/27* (2018.02); *H04W 80/10* (2013.01)

(58) Field of Classification Search
None
See application file for complete search history.

(56) References Cited

U.S. PATENT DOCUMENTS

2014/0192767 A1* 7/2014 Au ..................... H04L 1/0045
370/330
2018/0123763 A1* 5/2018 Yu ..................... H04W 72/085

FOREIGN PATENT DOCUMENTS

JP 2010-213337 A 9/2010
JP 2012-227890 A 11/2012

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.12.0 (Dec. 2014).
(Continued)

*Primary Examiner* — Saumit Shah
(74) *Attorney, Agent, or Firm* — ScienBiziP, P.C.

(57) ABSTRACT

Communication efficiency is improved in a case of using a grant-less communication scheme and a grant-based scheme. A radio terminal apparatus for communicating with a radio base station apparatus, which includes a transmitter configured to transmit a signal to the radio base station
(Continued)

apparatus, a receiver configured to receive a signal from the radio base station, and a controller configured to control the transmitter and the receiver. The controller is capable of selecting both a grant-based scheme and a grant-less communication scheme to transmit user data. In a case of transmitting the user data by using the grant-less communication scheme and adding a session identifier for identifying the radio terminal apparatus, a transmission of at least two parts that include a first part including the session identifier and a second part including the user data is performed at a time. First information for detecting an error in receiving the first part and second information for detecting an error in receiving the second part are added at the time of the transmission, regardless of the error in receiving the second part, and an amount of the first information and an amount of the second information are different from each other.

11 Claims, 12 Drawing Sheets

(51) Int. Cl.
*H04W 80/10* (2009.01)
*H04W 8/08* (2009.01)
*H04W 76/11* (2018.01)
*H04W 76/27* (2018.01)

(56) References Cited

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.7.0 (Feb. 2013).

* cited by examiner

RADIO TERMINAL APPARATUS, RADIO BASE STATION APPARATUS, MOBILITY MANAGEMENT APPARATUS, RADIO TRANSMISSION METHOD, RADIO COMMUNICATION METHOD, AND MOBILITY MANAGEMENT METHOD

TECHNICAL FIELD

The present invention relates to radio communication technologies.

BACKGROUND ART

Mobile communication technologies typified by mobile phones have been developed with the development of radio communication technologies. The mode of mobile phones has shifted from analog to digital, and the mobile phones now handle data communication. In many cases, unlike continuous signals such as audio signals with a fixed amount of information, data communication handles information whose amount varies over time. For this reason, packet communication (for example, NPL 1) has become widespread. Packet communication employs scheduling in a grant-based scheme, in which a radio terminal apparatus (User Equipment; UE) used in a mobile phone network does not have any radio resources assigned thereto when the radio terminal apparatus is not performing communication, and requests radio resources from a base station apparatus (NodeB, NB, or eNB) when the radio terminal apparatus has communication data so that the radio resources are assigned for the radio terminal apparatus to perform communication.

In addition, integrated circuits have enabled small electronic devices to support communication function. Applications based on communication between devices have been developed, the communication being called Internet of Things (IoT) in which the communication function is supported on devices that people do not directly operate and the devices are connected to the Internet. Such a device is usually designed to operate by using a built-in battery without using a power line.

Furthermore, such a device is usually produced for specific applications, and, in this case, a device is designed so that the device can perform a targeted application by exchanging minimum information.

CITATION LIST

Non Patent Literature

NPL 1: 3GPP TS36.300 V10.12.0 (2014-12)
NPL 2: 3GPP TS36.211 V10.7.0 (2013-02)

SUMMARY OF INVENTION

Technical Problem

However, in a case that the amount of information used by an application can be extremely small, the amount of information exchanged by a device used for the application during a single communication is also small. In such a case, a data communication method by using the grant-based scheme requires a procedure for requesting radio resources before exchanging information, and hence, it is not possible to ignore the amount of information required for the procedure for requesting the radio resources with respect to the amount of information to be exchanged and the time required for the procedure.

To reduce the effort to request the radio resources, studies have been made to introduce, to mobile phones, a so-called grant-less communication scheme (also referred to as grant-free communication scheme) that does not use the procedure for requesting the radio resources. In radio networks of mobile phones, however, a scheduling scheme in which radio resources are requested and scheduled in advance in response to the radio resource requests is used. The scheduling scheme has a different purport from the grant-less communication scheme that uses the radio resources in an arguably disordered manner. Thus, a system that is efficient when using the scheme for scheduling the radio resources in advance and a system that is efficient when using the grant-less communication scheme are different from each other. In a case that both schemes are used, there is a problem in that a system needs to be prepared not to reduce efficiency.

Solution to Problem

An aspect of the present invention provides a radio terminal apparatus, in which both a grant-based scheme and a grant-less communication scheme can be selected to transmit user data, there are at least two states that include a connected state and an idle state, a connection with the radio base station apparatus is temporarily halted to switch to the idle state, in a case of resuming the connection from the idle state along with transmission of the user data, the user data is transmitted by using the grant-less communication scheme, and an identifier for identifying the connection with the radio base station apparatus is added and transmitted in transmitting the user data.

Moreover, according to another aspect of the present invention, provided is a radio terminal apparatus, in which, in a case of transmitting the user data, the radio terminal apparatus adds and transmits information for detecting an error in receiving the identifier for identifying the connection with the radio base station apparatus regardless of an error in receiving the user data at the radio base station apparatus.

Moreover, according to another aspect of the present invention, provided is a radio terminal apparatus, in which, in a case of receiving a NACK and radio resource allocation information from the radio base station apparatus after the transmission of the user data, a radio resource indicated by the radio resource allocation information is used to retransmit the user data by using the grant-based scheme.

Moreover, according to another aspect of the present invention, provided is a radio base station apparatus, which receives a signal, transmitted by a radio terminal apparatus by using a grant-less communication scheme, the signal including an identifier for identifying a connection with the radio terminal apparatus, a session identifier, and user data, and in a case that an error in receiving the user data is detected and the identifier for identifying the connection with the radio terminal apparatus is received without error, allocates a radio resource to be used in a grant-based scheme to the radio terminal apparatus, and transmits to the radio terminal apparatus a NACK and the radio resource allocated.

Moreover, according to another aspect of the present invention, provided is a radio base station apparatus, which receives a signal, transmitted by a radio terminal apparatus by using a grant-less communication scheme, the signal including an identifier for identifying a connection with the radio terminal apparatus, a session identifier, and user data, and even in a case that the user data and the identifier for identifying the connection with the radio terminal apparatus are received without an error, and the connection corresponding to the identifier for identifying the connection with the radio terminal apparatus is in a dormant state, transmits an ACK for the user data with the connection being in a connected state.

Advantageous Effects of Invention

In a radio terminal apparatus, both a grant-based scheme and a grant-less communication scheme can be selected at the time of transmitting user data and the states of the radio terminal apparatus includes at least two states including a connected state and an idle state. The user data is transmitted by using the grant-less communication scheme in a case a transmission of the user data as well as a connection are resumed from the idle state in which the connection with the radio base station apparatus is temporarily halted, and an identifier for identifying the connection with the radio base station apparatus is added and transmitted at the time of transmission of the user data, thus improving the communication efficiency at the time of resuming connection. Furthermore, the information for detecting the error in receiving the identifier for identifying the connection with the radio base station apparatus is added and transmitted regardless of the error in receiving the user data. This improves communication efficiency in a case that there is no error in receiving the identifier for identifying the connection with the radio base station apparatus.

DESCRIPTION OF EMBODIMENTS

Radio communication technologies according to embodiments of the present invention will now be described in detail with reference to the drawings.

First Embodiment

Figure 2:
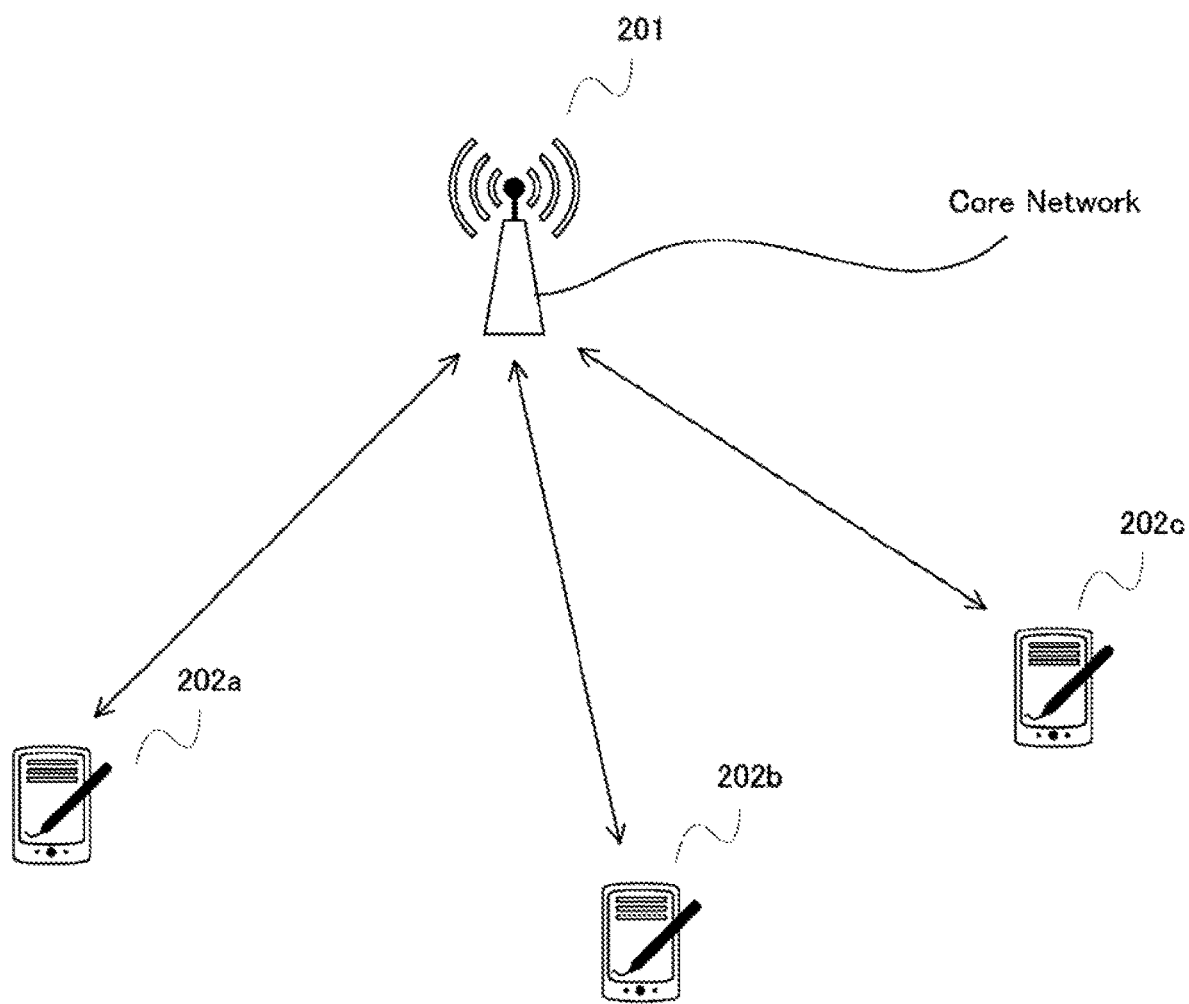
FIG. 2 is a diagram illustrating an example of a system configuration according to an embodiment of the present invention.

FIG. 2 illustrates an overview of an example radio communication system to which a first embodiment is applied. A plurality of radio terminal apparatuses 202a to 202c are connected to a radio base station apparatus 201. The number of radio terminal apparatuses connected may depend on the capability of the radio base station apparatus 201, and may vary from time to time. The radio base station apparatus 201 is connected to a core network and communicates with several control devices in the core network to control and maintain the mobile phone network. In addition, the radio base station apparatus 201 can communicate with equipment on the Internet via some of the control devices.

Figure 3A:
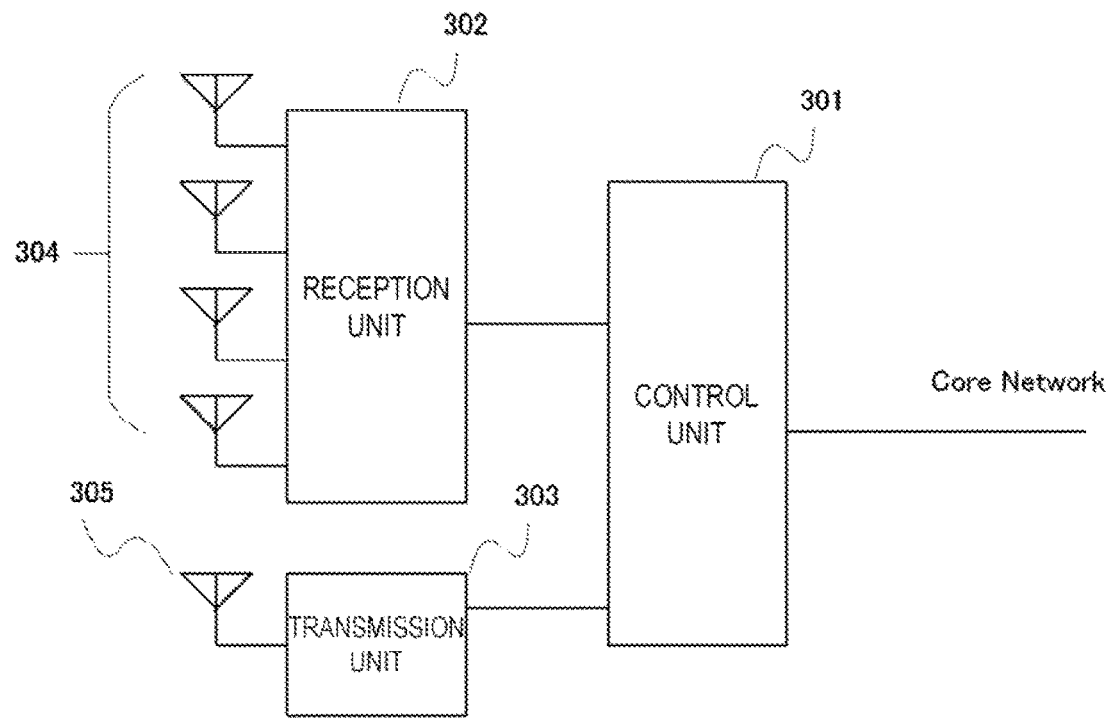
FIGS. 3A and 3B are diagrams, each illustrating an example of a configuration of units used in an embodiment of the present invention.

FIG. 3A illustrates an example schematic configuration of the radio base station apparatus 201. The reference sign 301 represents a controller configured to manage radio resources for transmission and radio resources for reception and control communication with the equipment on the core network. The reference sign 302 represents a receiver configured to demodulate and decode signals received by a receiving antenna unit 304 to retrieve information required for the controller 301 to manage the radio resources and to communicate with the equipment on the core network. The reference sign 304 represents the receiving antenna unit configured to receive radio signals and inputs the received signals to the receiver 302. The reference sign 303 represents a transmitter configured to generate transmit signals according to the radio resources for transmission controlled by the controller. The reference sign 305 represents a transmitting antenna unit configured to transmit the transmit signals generated by the transmitter 303. The receiving antenna unit 304 may include a plurality of antenna elements to demodulate signals arriving from the plurality of radio terminal apparatuses or to perform receive diversity. The transmitting antenna unit 305 may include a plurality of antenna elements to increase information included in the transmit signals through simultaneous transmission or to perform transmit diversity.

Figure 3B:
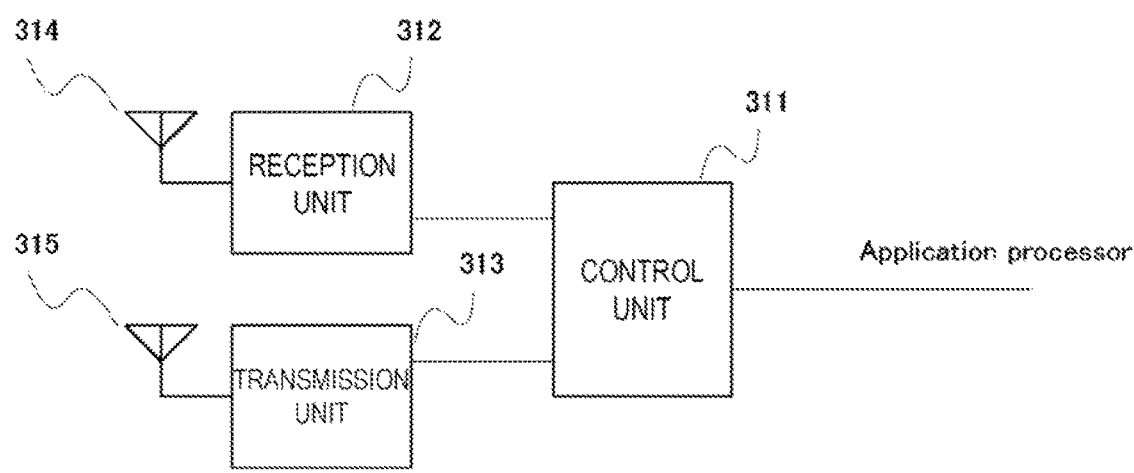

FIG. 3B illustrates an example schematic configuration of the radio terminal apparatuses 202a to 202c. The reference sign 311 represents a controller configured to manage radio resources for transmission by using received data obtained from a receiver 312, generate transmit data, input the transmit data into a transmitter 313, retrieve, from received signals, data used by the radio terminal apparatus to which the controller 311 belongs, and transmit and/or receive data to and/or from a connected application processor. The reference sign 312 represents the receiver configured to demodulate and decode received signals input from a receiving antenna unit 314 and perform output to the controller. The reference sign 314 represents the receiving antenna unit configured to input the received radio signals into the receiver 312. The reference sign 313 represents the transmitter configured to generate transmit signals according to information input from the controller. The reference sign 315 represents a transmitting antenna unit configured to transmit the transmit signals output from the transmitter. The receiving antenna unit 314 may include a plurality of antenna elements to demodulate signals arriving from the plurality of radio terminal apparatuses or to perform receive diversity. The transmitting antenna unit 315 may include a plurality of antenna elements to increase information included in the transmit signals through simultaneous transmission or to perform transmit diversity.

Figure 4:
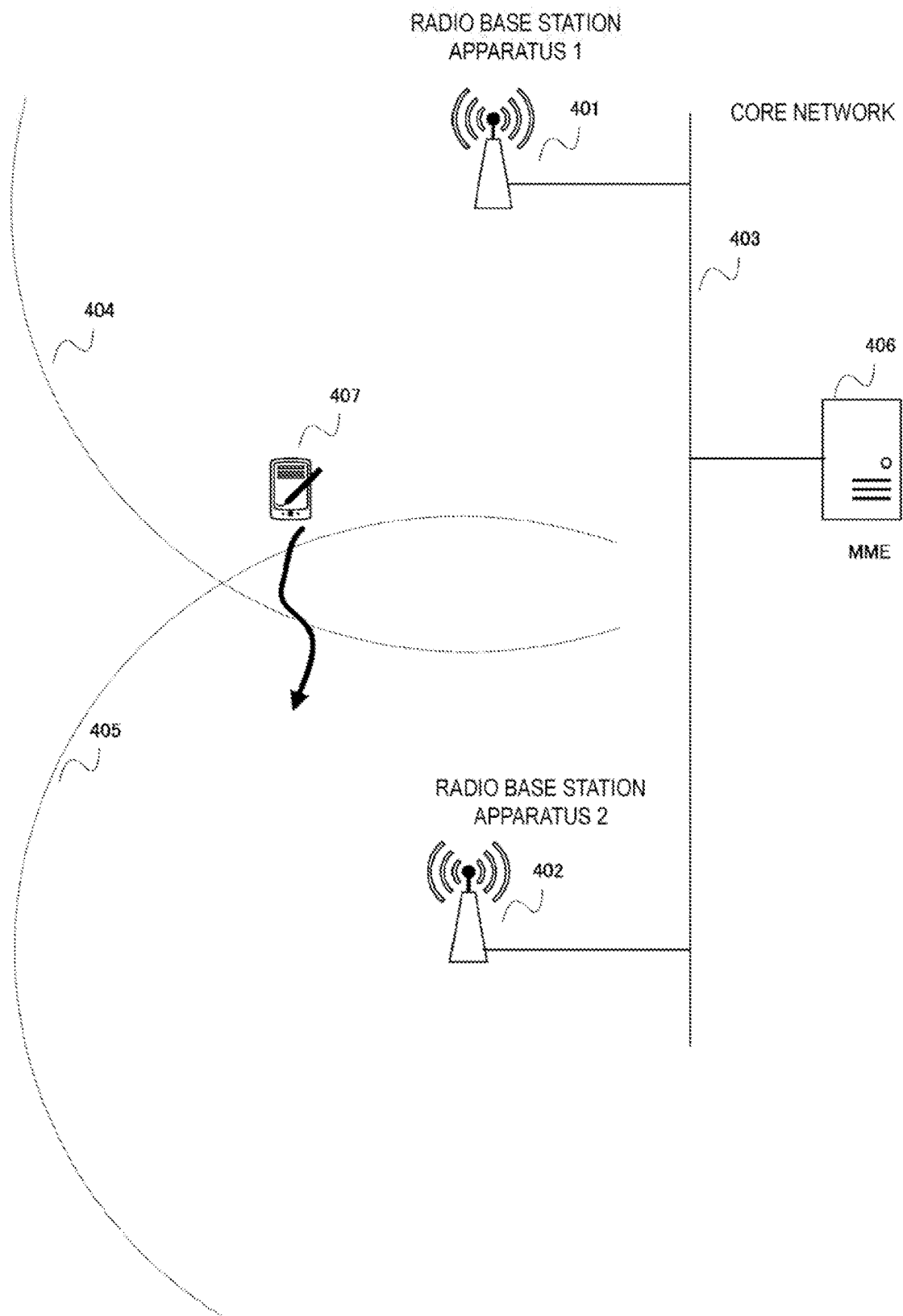
FIG. 4 is a diagram illustrating an example of a movement of a radio terminal apparatus according to an embodiment of the present invention.

A plurality of radio base station apparatuses are connected by the core network and managed by the equipment on the core network. By arranging the plurality of radio base station apparatuses at different locations to shift the communication areas that the respective radio base station apparatuses cover from each other, it is possible to expand the service area of the entire mobile phone network. In a case that a radio terminal apparatus connected to a radio base station apparatus moves out of the service area covered by the radio base station apparatus into the service area covered by another radio base station apparatus, the radio base station apparatuses cooperate with equipment on the core network to prevent the communication performed by the radio terminal apparatus from being interrupted. FIG. 4 illustrates an example of the configuration for achieving the operation described above. A radio base station apparatus 1.401 and a radio base station apparatus 2.402 are located at different locations and are connected via a core network 403. The radio base station apparatus 1.401 covers a service area 404, and the radio base station apparatus 2.402 covers a service area 405. A Mobility Management Entity (MME) 406 is also connected to the core network 403. A description will be made of an example of operation in a case that a radio terminal apparatus 407 moves out of the service area 404 of the radio base station apparatus 1.401 into the service area 405 of the radio base station apparatus 2.402 in the above-described configuration.

The radio terminal apparatus 407 periodically informs the radio base station apparatus 1.401 of the quality of signals transmitted from the radio base station apparatus 1 and the quality of signals transmitted from other radio base station apparatuses. In this case, the quality of the signals transmitted from the radio base station apparatus 2.402 is used as the quality of the signals transmitted from the other radio base station apparatuses. As the radio terminal apparatus 407 moves, in the quality information that the radio terminal apparatus 407 informs to the radio base station apparatus 1.401, the quality of the signals transmitted by the radio base station apparatus 2.402 becomes better than the quality of the signals transmitted by the radio base station apparatus 1.401. In a case that this state occurs, the radio base station apparatus 1.401 requests the radio base station apparatus 2.402 to cause the radio terminal apparatus 407 to be handed over to the radio base station apparatus 2.402. The radio base station apparatus 2.402 checks the state of radio resources that the radio base station apparatus 2.402 handles to determine whether to accept the handover, and notifies the radio base station apparatus 1.401 of the acceptance of the handover. The radio base station apparatus 1.401 indicates, to the radio terminal apparatus 407, a handover so that the current connection is changed to the connection to the radio base station apparatus 2.402. In addition, the radio base station apparatus 1.401 transfers, to the radio base station apparatus 2.402, a context required to manage the connection with the radio terminal apparatus 407. The radio terminal apparatus 407, to which the handover is indicated, starts a procedure with the radio base station apparatus 2.402 to reconfigure the connection from the current connection with the radio base station apparatus 1.401 to the connection with the radio base station apparatus 2.402 according to the instruction. The radio base station apparatus 2.402 uses the context of the radio terminal apparatus 407 received from the radio base station apparatus 1.401 to reconfigure the connection, and, in a case that the procedure is successfully completed, notifies the radio terminal apparatus 407 of the successful completion of the process. In addition, the MME 406 is notified of an allocation of a data path for the radio terminal apparatus 407. The MME 406 checks the connection of the radio terminal apparatus 407 and, in a case that the data path needs to be changed, cooperates with other equipment in the core network to allocate a data path for the radio terminal apparatus 407.

While periodically reporting, to the connected radio base station apparatus, the quality of the signals transmitted from the radio base station apparatus, the radio terminal apparatus 407 uses a mechanism in which reception of radio signals, including reception of signals for the quality report, is less frequently performed to reduce the power consumption. This mechanism is called Discontinuous Reception (DRX). By notifying, to the radio base station apparatus, that the radio terminal apparatus 407 can use the DRX function, the radio terminal apparatus 407 can perform discontinuous reception during a period when no radio resources are allocated by the radio base station apparatus. The interval of the discontinuous reception is managed based on the system frame period. The information about the DRX is notified to the MME 406 through the base station. In a case that no radio resources are allocated to the radio terminal apparatus 407 for a long period of time, the radio terminal apparatus 407 may be disconnected and switched from the connected state to the idle state.

In a case that the radio terminal apparatus 407 enters in the idle state, a communication connection needs to be reconfigured to restart a communication. The procedure of reestablishing the connection is time-consuming and thus wastes time in an application in which the state is frequently changed between the idle state and the connected state, thus reducing the efficiency of the mobile phone network. To address this issue, in a case that no radio resources are allocated for a long period of time in the connected state, the connection is temporarily halted, and the context of the connection is saved during the halt. The saved context is reused at the time of resuming the connection. This allows the procedure of reestablishing the connection to have less sequences compared with the procedure of establishing a connection. In order to identify the saved context at the time of resuming the connection, a session ID corresponding to the connection is prepared. Then, this session ID is specified to save the context at the time of temporarily halting the connection, and is specified to reuse the context at the time of resuming the connection.

Figure 5:
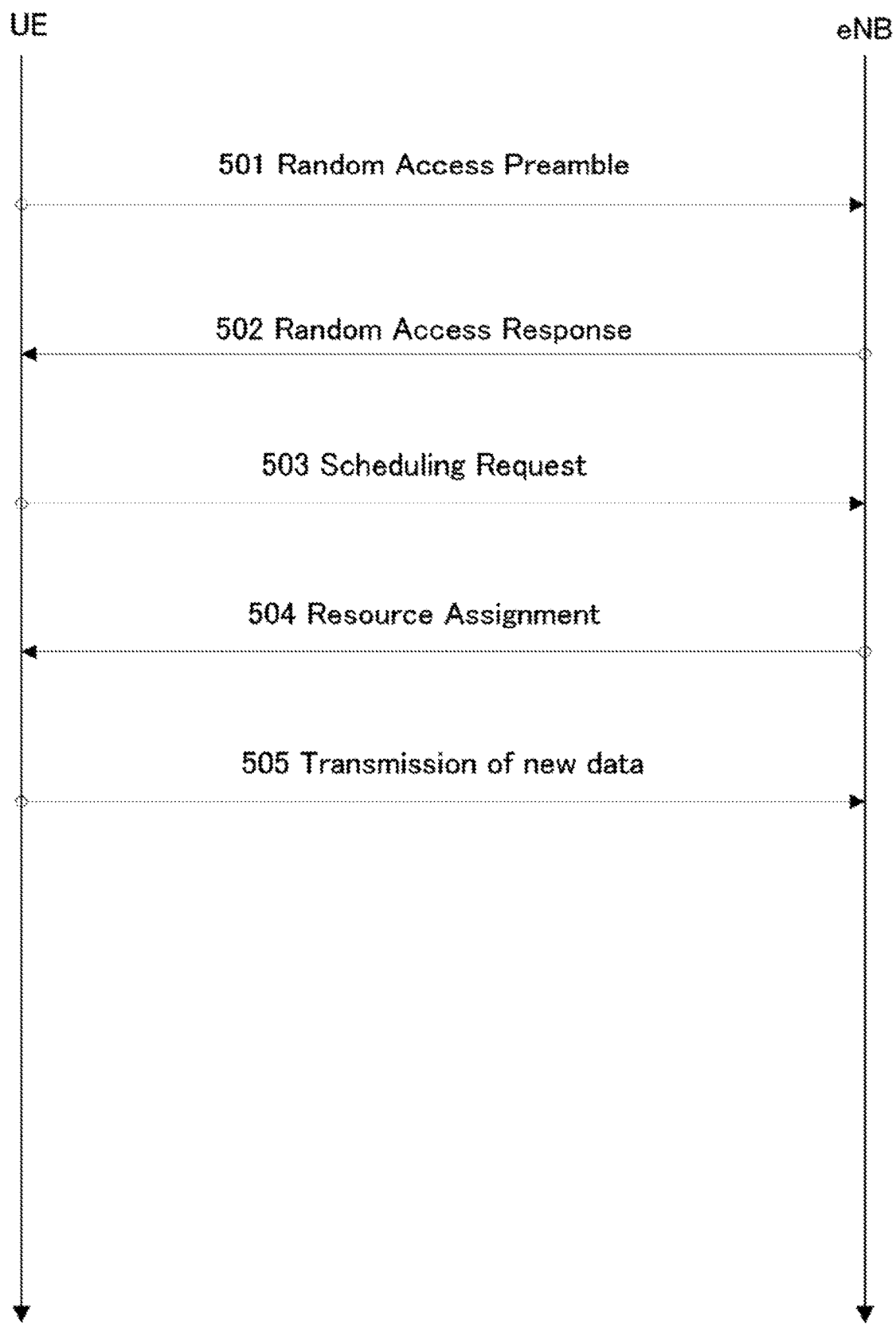
FIG. 5 is an example flow of a random access in a grant-based scheme.

FIG. 5 illustrates an overview of a flow of an example communication by using a typical grant-based scheme. In this example, a radio terminal apparatus performs a new communication with a radio base station apparatus. First, in the step 501, the radio terminal apparatus to which no radio resources are allocated uses an available random access channel to transmit a random access preamble including short information from the radio terminal apparatus to the radio base station apparatus. The information included in the random access preamble may include values randomly selected from several values based on the information notified by the radio base station apparatus. The radio base station apparatus, which receives the random access preamble, transmits, in the step 502, a random access response to the radio terminal apparatus that has transmitted the random access preamble. The random access response may include the information included in the random access preamble to indicate the random access preamble to which the random access response corresponds. In addition, the random access response may include an indication about a radio resource that the radio terminal apparatus uses to subsequently transmit a scheduling request. The radio terminal apparatus, which receives the random access response, checks whether the received random access response corresponds to the random access preamble that the radio terminal apparatus itself has transmitted. In a case that the random access response corresponds to the random access preamble and specifies a radio resource for transmitting a scheduling request, the radio terminal apparatus transmits a scheduling request in the step 503. The scheduling request may include a connection configuration request in a case of an initial communication and, in a case that connection has been established, may include information about an identifier used for the established connection and a required radio resource. The radio base station apparatus, which receives the resource request, identifies the radio terminal apparatus that has transmitted the resource request by using the connection configuration request or the identifier used by the radio terminal apparatus that is already connected to the radio base station apparatus. The radio base station apparatus then prepares a radio resource to the radio terminal apparatus and notifies the radio terminal apparatus of the allocation of the prepared radio resource in the step 504. The radio terminal apparatus, which receives the notification of the radio resource allocation, verifies that the notification of the radio resource allocation is addressed to the radio terminal apparatus itself, and newly transmits transmission data by using the allocated radio resource in the following step 506.

In a case that a grant-less communication scheme is used, unlike the example illustrated in FIG. 5, a transmission of transmit data is newly started without transmitting information, such as 501 random access preamble and 503 resource request, for requesting the resource. In other words, the transmission of new transmit data is started without allocating the radio resource in advance. This means that, in particular, in a case that transmission is performed using the grant-less communication scheme in an environment where a plurality of radio terminal apparatuses exist, conflicts occur among a plurality of pieces of transmitted data, and the radio base station apparatus fails to demodulate and decode the content of the transmitted data. In a case of data transmission failure, retransmission is typically performed for recovery. However, using the grant-less communication scheme again during retransmission may cause another failure in transmission due to another conflict. If this situation continues, the utilization efficiency of the radio resources is degraded compared with that in transmission using the grant-based scheme.

In this embodiment, information required for radio resource allocation is transmitted in addition to the data to be transmitted at the initial transmission by using the grant-less communication scheme. In a case that the transmitted data are successfully demodulated and decoded, the radio base station apparatus only returns an acknowledgment (ACK), whereas in a case that the demodulation and the decoding of the transmitted data fail, radio resource allocation information for retransmission is transmitted together with a negative acknowledgment (NACK). An example of this procedure will be described with reference to FIGS. 1A and 1B.

Figure 1A:
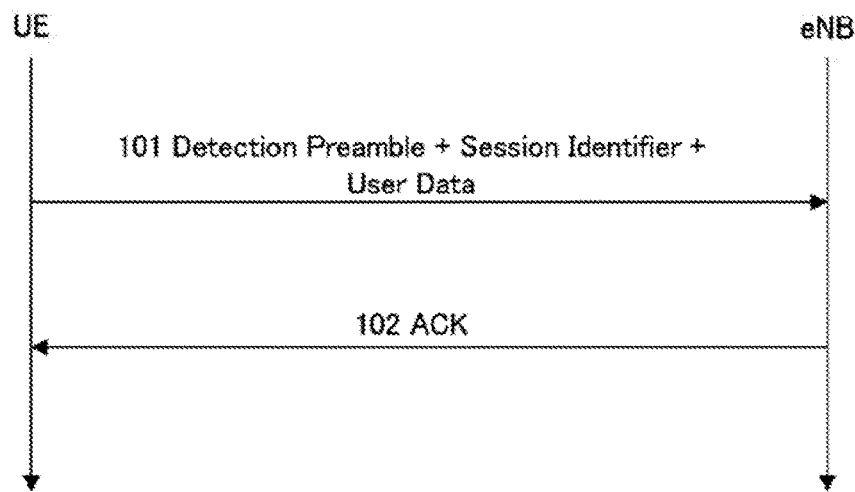
FIGS. 1A and 1B are diagrams, each illustrating a flow of information according to an embodiment of the present invention.

FIG. 1A illustrates an example of a procedure in a case of transmission of an ACK. It is assumed that the radio terminal apparatus is connected to the radio base station apparatus in advance and some pieces of information used for the connection, for example, a temporary identifier for identifying the radio terminal apparatus used for the connection and an identifier (session identifier) for identifying the connection, are assigned to the radio terminal apparatus. The session identifier may also have a function of identifying the radio terminal apparatus. In this case, an address space larger than the address space used by the temporary identifier for identifying the radio terminal apparatus may be assigned to the session identifier. For example, in a case that the address space of the temporary identifier for identifying the radio terminal apparatus is 16-bits in length, the address space used by the session identifier may be 24-bits or 40-bits in length to enable identification of a set of the connection and the radio terminal apparatus by using the session identifier. Although the radio terminal apparatus and the connection are identified by using the session identifier in the following example, information for identifying the radio terminal apparatus and information for identifying the connection may be separately transmitted. In the step 101, the radio terminal apparatus transmits, to the radio base station apparatus, a packet including a detection preamble for identifying a transmission as the transmission using the grant-less communication scheme, a session identifier, and user data by using the grant-less communication scheme. At this moment, the session identifier and the user data are transmitted in a format with which it is possible to check whether the session identifier and the user data are correctly demodulated and decoded. For example, it may be possible to use a method in which a CRC code for error detection is added to each of the session identifier and the user data. The radio base station apparatus receives the packet transmitted from the radio terminal apparatus using the grant-less communication scheme, demodulates and decodes the session identifier and the user data included in the packet, and then checks whether the session identifier and the user data are correctly demodulated and decoded. After the session identifier and the user data are correctly decoded, the radio base station apparatus transmits an ACK in the step 503 to the radio terminal apparatus that has transmitted the packet.

Figure 1B:
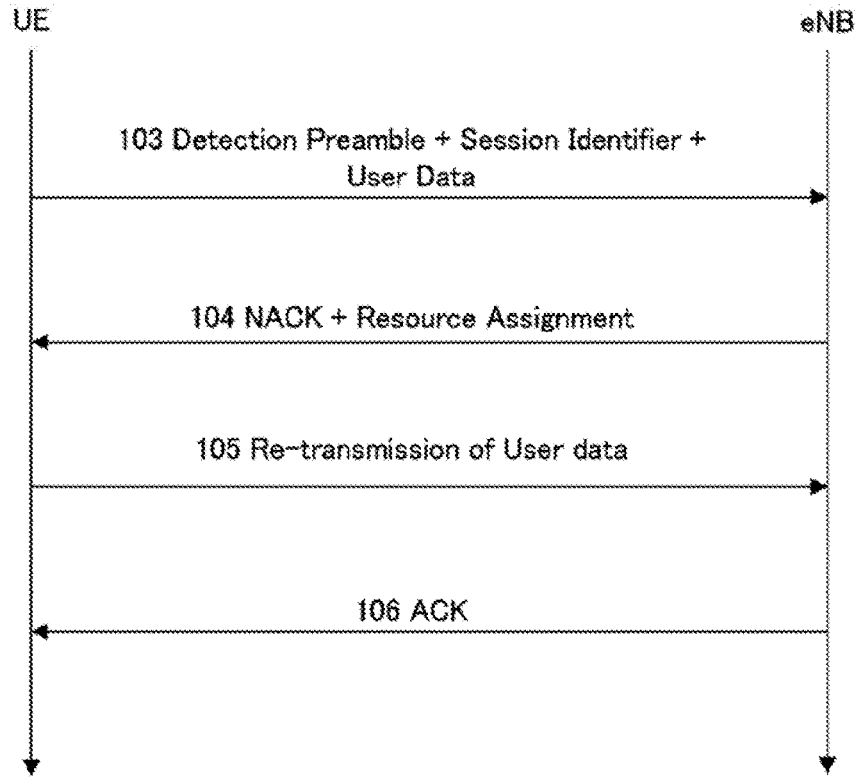

FIG. 1B illustrates an example of a procedure in a case of transmission of a NACK. As in FIG. 1A, it is assumed that a session identifier for identifying the terminal and the connection is assigned in advance. In the step 103, the radio terminal apparatus transmits, to the radio base station apparatus, a packet including a detection preamble for identifying a transmission as the transmission using the grant-less communication scheme, a session identifier, and user data. The radio base station apparatus, which receives the packet, demodulates and decodes the session identifier and the user data included in the packet and checks whether the session identifier and the user data are correctly demodulated and decoded. In a case that the session identifier is successfully demodulated and decoded and that the demodulation and the decoding of the user data fail, the radio base station apparatus transmits, to the radio terminal apparatus, a NACK and radio resource allocation information for retransmission in the step 104. Since the session identifier is correctly received, it is possible to identify a radio terminal apparatus from which the packet is received and a connection through which the packet is received, and thus, a radio resource for a communication using this connection can be allocated. The radio terminal apparatus that receives the NACK and the radio resource allocation for retransmission determines that the preceding transmission using the grant-less communication scheme has failed, and then uses the radio resource allocated for retransmission to retransmit the user data in the step 105. The radio base station apparatus, which receives the retransmitted user data by using the allocated radio resource, checks that the user data is successfully demodulated and decoded, and transmits an ACK to the radio terminal apparatus in the step 106.

In this manner, the radio base station apparatus performs, to the radio terminal apparatus, a process for transmitting the ACK and a process for transmitting the NACK. This makes it possible to efficiently switch between the grant-less communication scheme and the grant-based scheme, thus allowing radio resources to be efficiently used.

Second Embodiment

Figure 6:
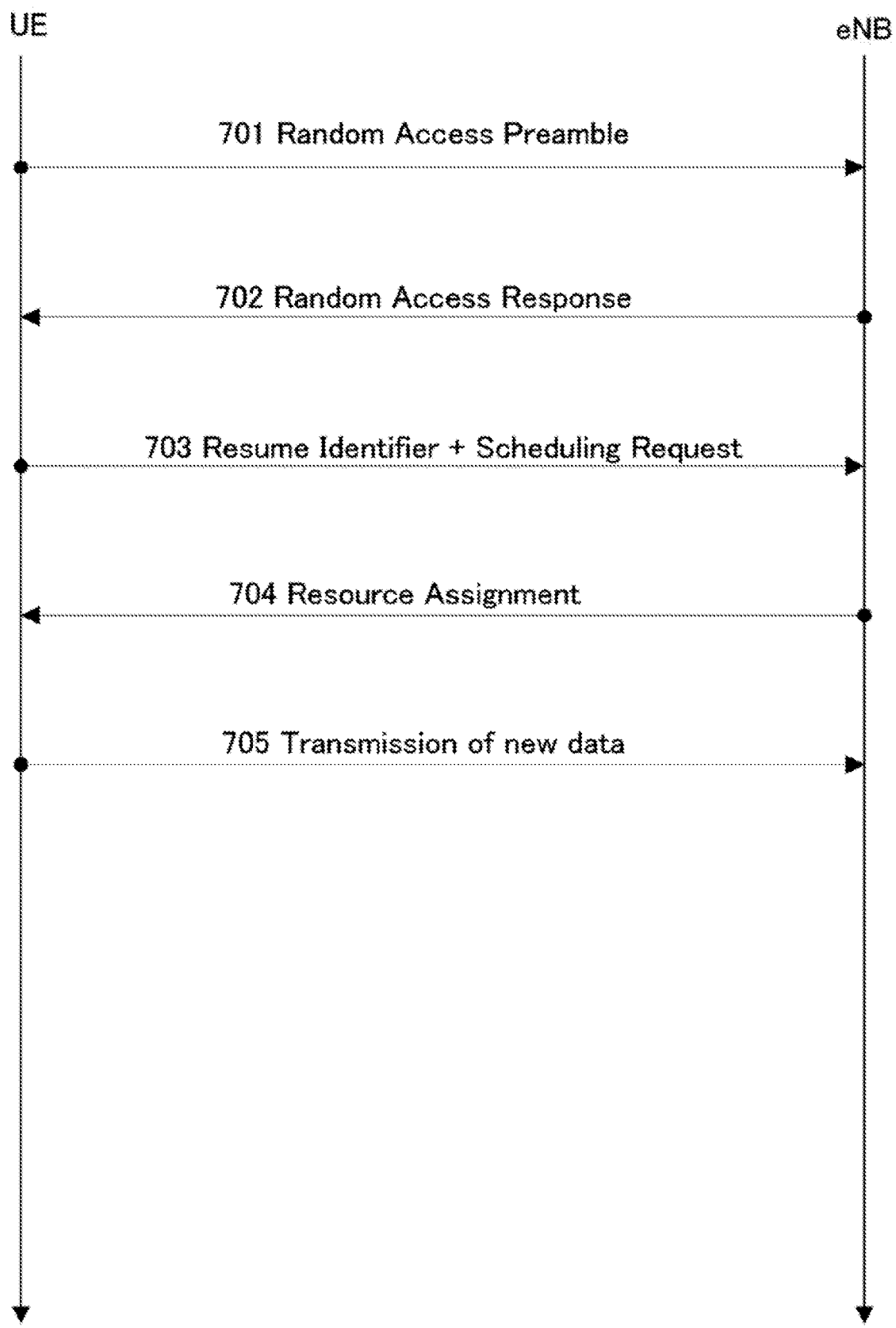
FIG. 6 is an example flow of a connection resumption in the grant-based scheme.

An example of a procedure for recovering a connection from the idle state by using a session identifier will now be described with reference to FIG. 6. In the step 701, a radio terminal apparatus uses a random access channel to transmit a random access preamble to a radio base station apparatus. The radio base station apparatus, which receives the random access preamble, transmits a random access response including radio resource allocation for transmitting a scheduling request to the radio terminal apparatus in the step 702. The radio terminal apparatus that receives the random access response determines whether the random access response corresponds to the random access preamble that the radio terminal apparatus itself has transmitted. In a case that the random access response corresponds to this random access preamble, the radio terminal apparatus transmits a scheduling request in the step 703. At this moment, a resume identifier is transmitted in addition to the scheduling request. The resume identifier is used to identify the preceding connection for the resumption of the connection and may be similar to the session identifier. The radio base station apparatus that receives the resume identifier and the scheduling request determines which radio terminal apparatus has transmitted the received scheduling request, and also determines whether the radio base station apparatus retains, with the radio terminal apparatus, a resumable connection indicated by the received resume identifier. At this moment, it may be possible to only use the resume identifier to identify the radio terminal apparatus and determine whether the connection is retained. In a case that information about a connection corresponding to the identified radio terminal apparatus is retained, the radio base station apparatus allocates, in the step 704, a radio resource based on the retained information about the connection without any specific procedure for connection configuration, and transmits the radio resource allocation information to the radio terminal apparatus. The radio terminal apparatus, which receives the radio resource allocation information, uses the received radio resource allocation information to transmit user data in the step 705. The embodiment describes an example of improving the efficiency in the series of steps described above by using the grant-less communication scheme at the time of resuming the connection.

Figure 7A:
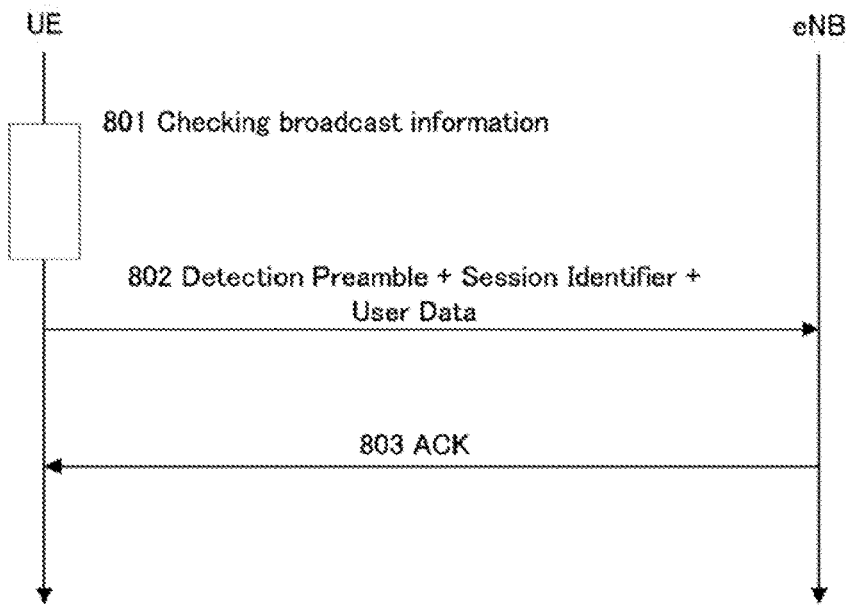
FIGS. 7A and 7B are diagrams, each illustrating a flow of information according to an embodiment of the present invention.
Figure 7B:
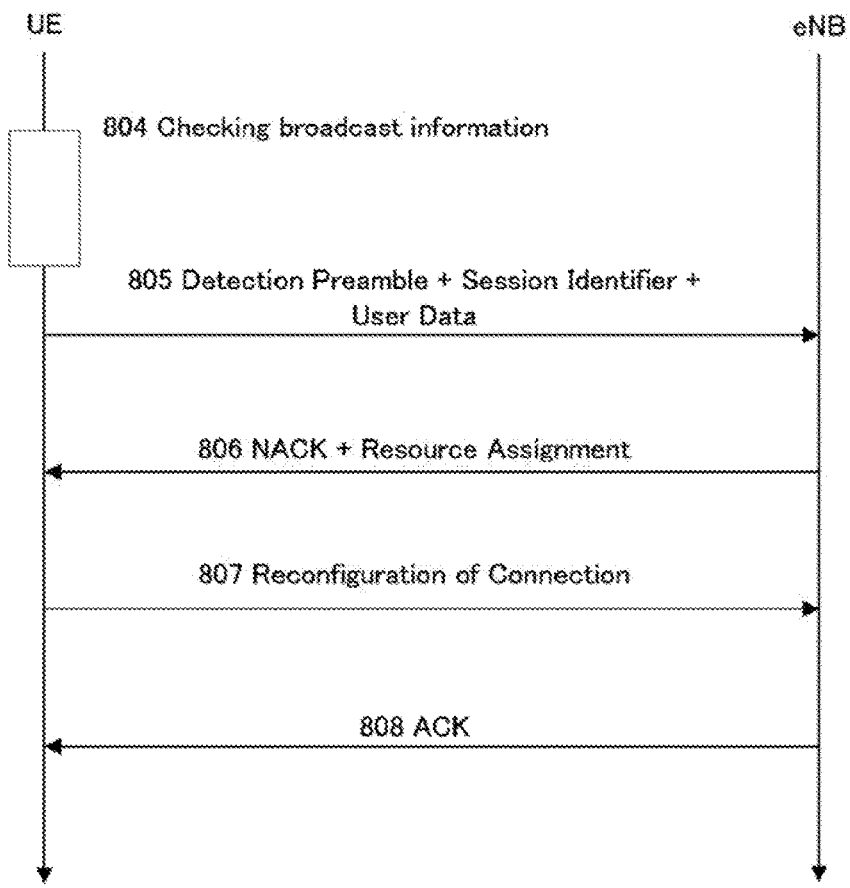

FIGS. 7A and 7B each illustrate an example of a flow of information according to this embodiment. FIG. 7A illustrates an example of a case of successful connection resumption, and FIG. 7B illustrates an example of a case of unsuccessful connection resumption followed by a connection reconfiguration. First, the example of successful connection resumption will be described. In a case that a radio terminal apparatus tries to recover the connection from the idle state, the radio terminal apparatus first receives broadcast information transmitted by a radio base station apparatus and determines, by using the broadcast information, whether there is a possibility that the radio base station apparatus retains the connection information before the transition to the idle state. A method of determining the possibility by using the broadcast information is not particularly limited. It may be possible to make the determination, for example, by comparing the state of a physical identifier, a virtual identifier, a tracking area code, a CSG identifier, frequency information, or the like of a cell managed by the radio base station apparatus, with the state thereof before the transition to the idle mode. After determining that the connection information is retained, the radio terminal apparatus transmits, in the step 802, a packet including a detection preamble for identifying a transmission as the transmission in the grant-less communication scheme, a session identifier, and user data, to the radio base station apparatus by using the grant-less communication scheme. The radio base station apparatus, which receives the packet, checks whether the session identifier and the user data included in the packet can be correctly demodulated and decoded. In a case that the session identifier and the user data are correctly demodulated and decoded, the radio base station apparatus determines whether the session identifier corresponds to the connection information that the radio base station apparatus retains. In a case that this session identifier corresponds to the connection information that the radio base station apparatus retains, the radio base station apparatus recovers the connection and processes the user data, which is transmitted together with the session identifier, on the assumption that the user data is transmitted through the connection. Then, the radio base station apparatus transmits an ACK to the radio terminal apparatus in the step 803. By using the procedure as described above, a part of the procedure for radio resource allocation at the time of the connection recovery can be omitted, thus allowing the utilization efficiency of the radio resources to be improved.

Next, an example of a case of unsuccessful connection recovery will be described with reference to FIG. 7A. In the step 804, the radio terminal apparatus receives broadcast information transmitted by the radio base station apparatus, and determines, by using the broadcast information, whether there is a possibility that the radio base station apparatus retains the connection information before the transition to the idle state. This operation is similar to the step 801. After determining that the connection information is retained, the radio terminal apparatus transmits, in the step 805, a packet including a detection preamble for identifying a transmission as the transmission in the grant-less communication scheme, a session identifier, and user data, to the radio base station apparatus by using the grant-less communication scheme. This operation is similar to the step 802. The radio base station apparatus, which receives the packet, checks whether the session identifier and the user data included in the packet can be correctly demodulated and decoded. In a case that the session identifier and the user data are correctly demodulated and decoded, the radio base station apparatus determines whether the session identifier corresponds to the connection information that the radio base station apparatus retains. In a case that the session identifier does not correspond to the connection information that the radio base station apparatus itself retains or in a case that the radio base station apparatus does not retain any connection information, the radio base station apparatus discards the received user data and, in the step 806, transmits to the radio terminal apparatus a NACK and radio resource allocation information for the connection reconfiguration. Like the operation in the step 806, in a case that the session identifier is successfully demodulated and decoded, the demodulation and the decoding of the user data fail, and the radio base station apparatus does not retain the connection information corresponding to the session identifier, the radio base station apparatus may transmit the NACK and the radio resource assignment information for the connection reconfiguration. The radio terminal apparatus that receives the NACK and the radio resource allocation information transmits, in the step 807, a connection reconfiguration request to the radio base station apparatus by using the allocated radio resource. The radio base station apparatus that receives the connection reconfiguration request reconfigures the connection with the radio terminal apparatus by using the received connection reconfiguration request, and, in a case of successful reconfiguration, transmits an ACK to the radio terminal apparatus in the step 808. In a case that the connection resumption using the grant-less communication scheme fails, the above operations allow the connection to be reconfigured so that the communication can be continued.

Figure 8:
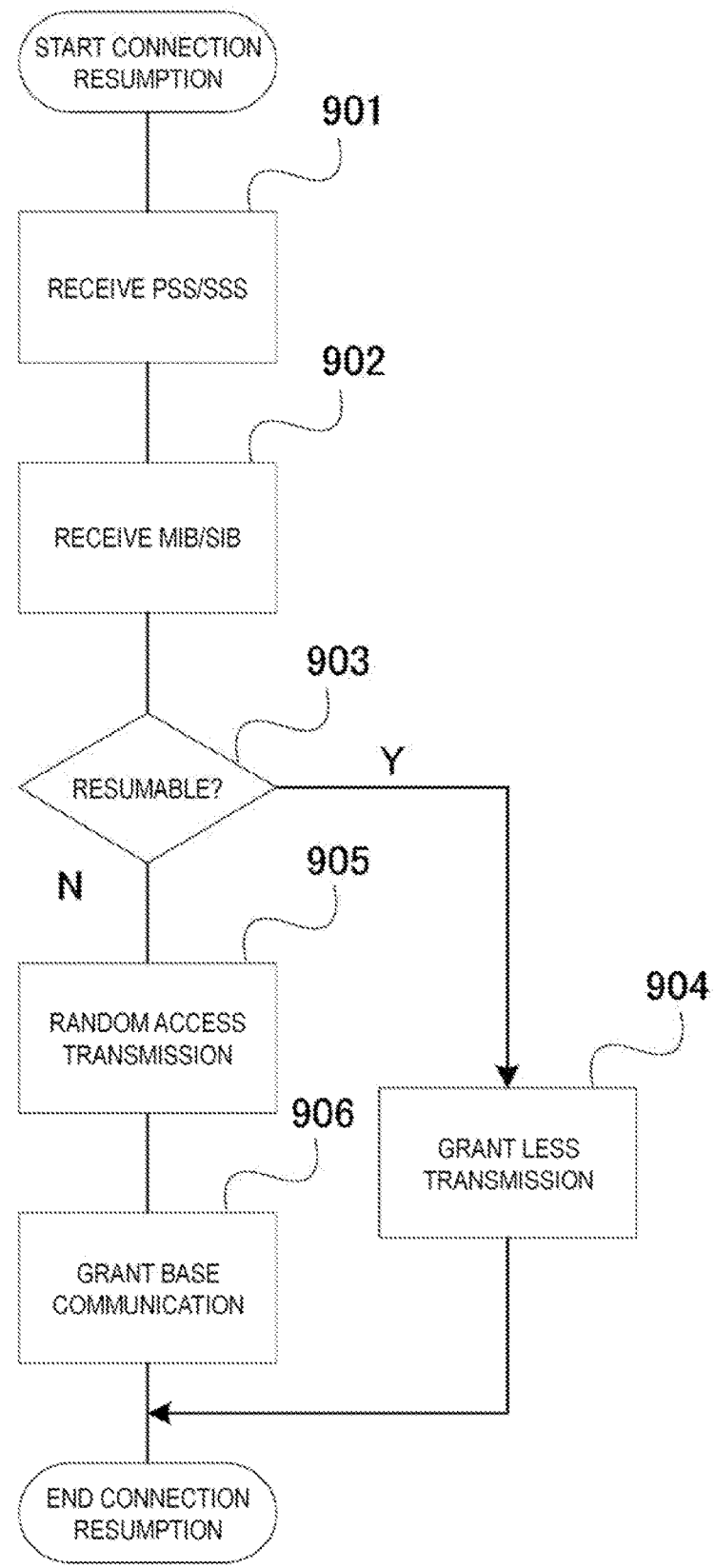
FIG. 8 is a flow chart illustrating the procedure of resuming a connection according to an embodiment of the present invention.

An example of processing performed by the radio terminal apparatus to achieve the above-described procedure will now be described with reference to FIG. 8. In a case of trying to resume the connection, the radio terminal apparatus first receives, in the step 901, a Primary Synchronization Signal (PSS) and a Secondary Synchronization Signal (SSS) broadcast from the radio base station apparatus to perform acquisition of a physical cell identifier and frame synchronization. Next, in the step 902, the radio terminal apparatus receives a Master Information Block (MIB) and System Information Blocks (SIBs) transmitted from the radio base station apparatus. Next, in the step 903, the radio terminal apparatus determines, by using the information acquired in the steps 901 and 902, whether the radio base station apparatus that has transmitted the received signals can resume the connection. The example of the determination method has been described above. It is possible to make determination, for example, by comparing the state of a physical identifier, a virtual identifier, a tracking area code, a CSG identifier, frequency information, or the like of a cell managed by the radio base station apparatus, with the state thereof before transition to the idle state. In a case that it is determined that the connection is resumable, the process proceeds to the step 904, and the transmission using the grant-less communication scheme is started. In a case that it is determined that the connection is not resumable, the process proceeds to the step 905, and the radio terminal apparatus performs a random access transmission to start communication using the grant-based scheme. The radio terminal apparatus receives a radio resource allocation from the radio base station apparatus and starts the transmission using the grant-based scheme in the step 906. The procedure is not particularly limited to the random access transmission and the transmission using the grant-based scheme, and a procedure described in NPL 1 may be used, for example.

Third Embodiment

Figure 9:
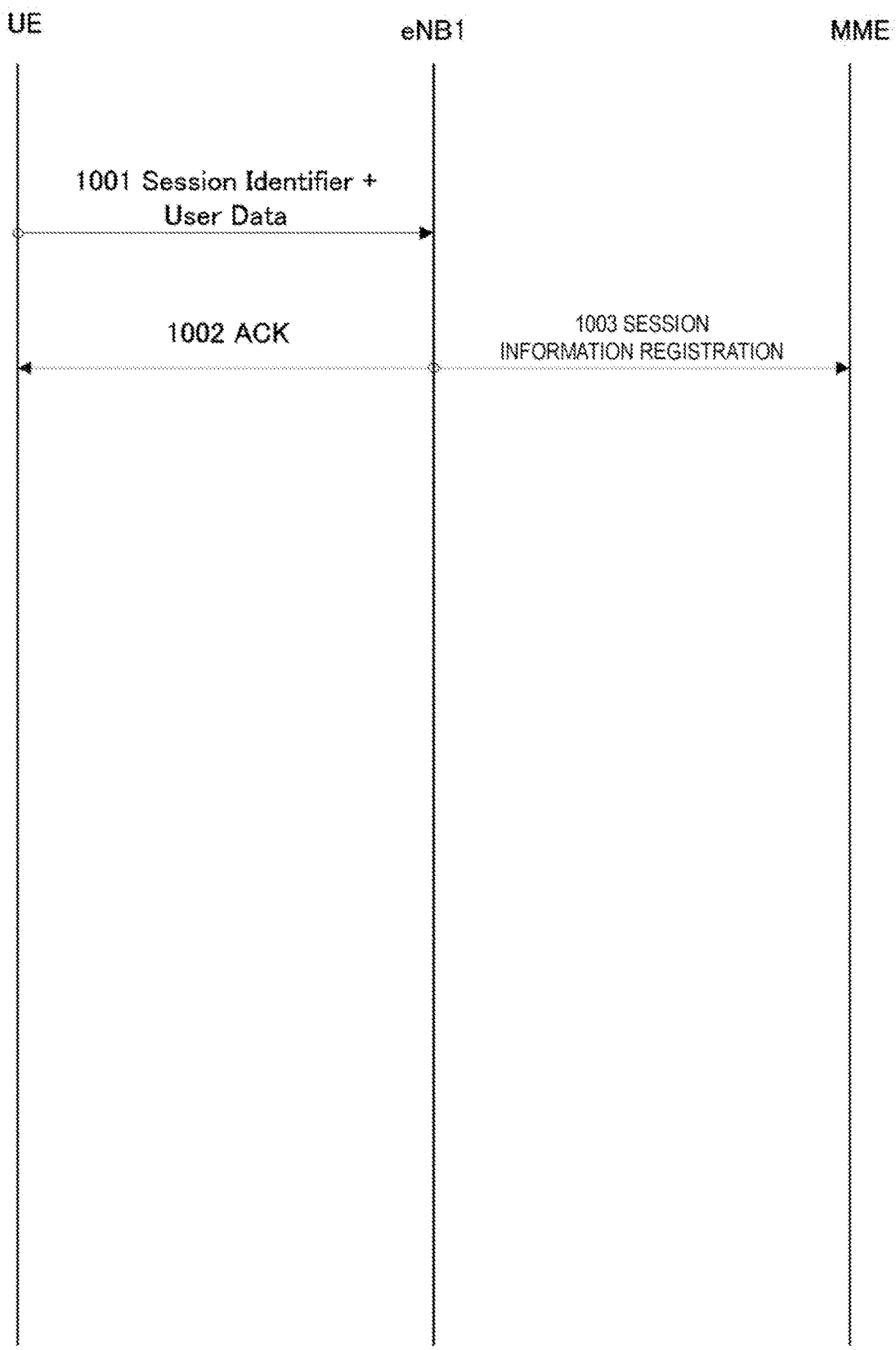
FIG. 9 is a diagram illustrating a flow of information according to an embodiment of the present invention.

The embodiment gives an example of a case that the grant-less communication scheme is used for mobility management of radio terminal apparatuses. As an example of this case, a description will be made of a case that a radio terminal apparatus first performs a communication using the grant-less communication scheme with a first radio base station apparatus, then moves, and switches the connection destination to a second radio base station apparatus. It is assumed that the radio terminal apparatus is connected to the radio base station apparatus in advance and some pieces of information used for the connection, for example, a temporary identifier, used for the connection, for identifying the radio terminal apparatus and an identifier (session identifier) for identifying the connection, are assigned to the radio terminal apparatus. FIG. 9 illustrates a flow of information in a case that the radio terminal apparatus communicates with the first radio base station apparatus by using the grant-less communication scheme. In the step 1001, the radio communication apparatus transmits user data to the radio base station apparatus. At this moment, a session identifier is transmitted in addition to the user data. In a case that the user data and the session identifier are received without error, the first radio base station apparatus transmits, in the step 1002, an ACK to the radio terminal apparatus that has transmitted the user data and the session identifier. In addition, in the step 1003, the session information about the radio terminal apparatus is registered in an MME for performing mobility management. The session information to be registered in the MME includes one or more pieces of information about the connection with the radio terminal apparatus. For example, the information may include the session identifier used for the connection between the radio terminal apparatus and the first radio base station apparatus, identification information about the radio terminal apparatus associated with the session identifier, identification information about the connection, management information about the security used for the connection, an IP address assigned to the radio terminal apparatus, data that has not been transmitted to the radio terminal apparatus in the first radio base station apparatus, and the like. The registration of the session information may be renewed every time a communication with the radio terminal apparatus is performed, or it may be possible to employ a method of renewing it once in plural communications, or a method of renewing it at regular intervals. Alternatively, rather than in the MME, the session information may be registered in an entity that performs mobility management of radio terminal apparatuses of which the number is smaller than the number of the radio base station apparatuses managed by the MME. In this case, an inquiry about the session information described below is performed to the entity. The entity may be independent or may be implemented as one of functions in any device connected to the core network. Moreover, at the time of transmission using the grant-less communication scheme, the radio terminal apparatus may employ a method of adding the session identifier not every time but once in plural transmissions, a method of adding the session identifier at regular intervals, or a method of adding the session identifier after returning from DRX, or the like.

The MME that receives the registration of the session information checks whether there is old session information about the radio terminal apparatus corresponding to the session information, and, in a case that there is the corresponding old session information, overwrites the old session information with the new session information. The MME may regularly check whether the registered session information is valid. The method for checking the validity of the session information is not particularly specified. For example, it may be possible to determine the validity based on the time period elapsed since certain session information is registered. The time period may be a predetermined time period such as 24 hours, one week, or one month, and it may be possible to determine whether it is valid or invalid based on other information such as billing information. In a case that it is determined that session information is invalid, the session information may be deleted.

Figure 10:
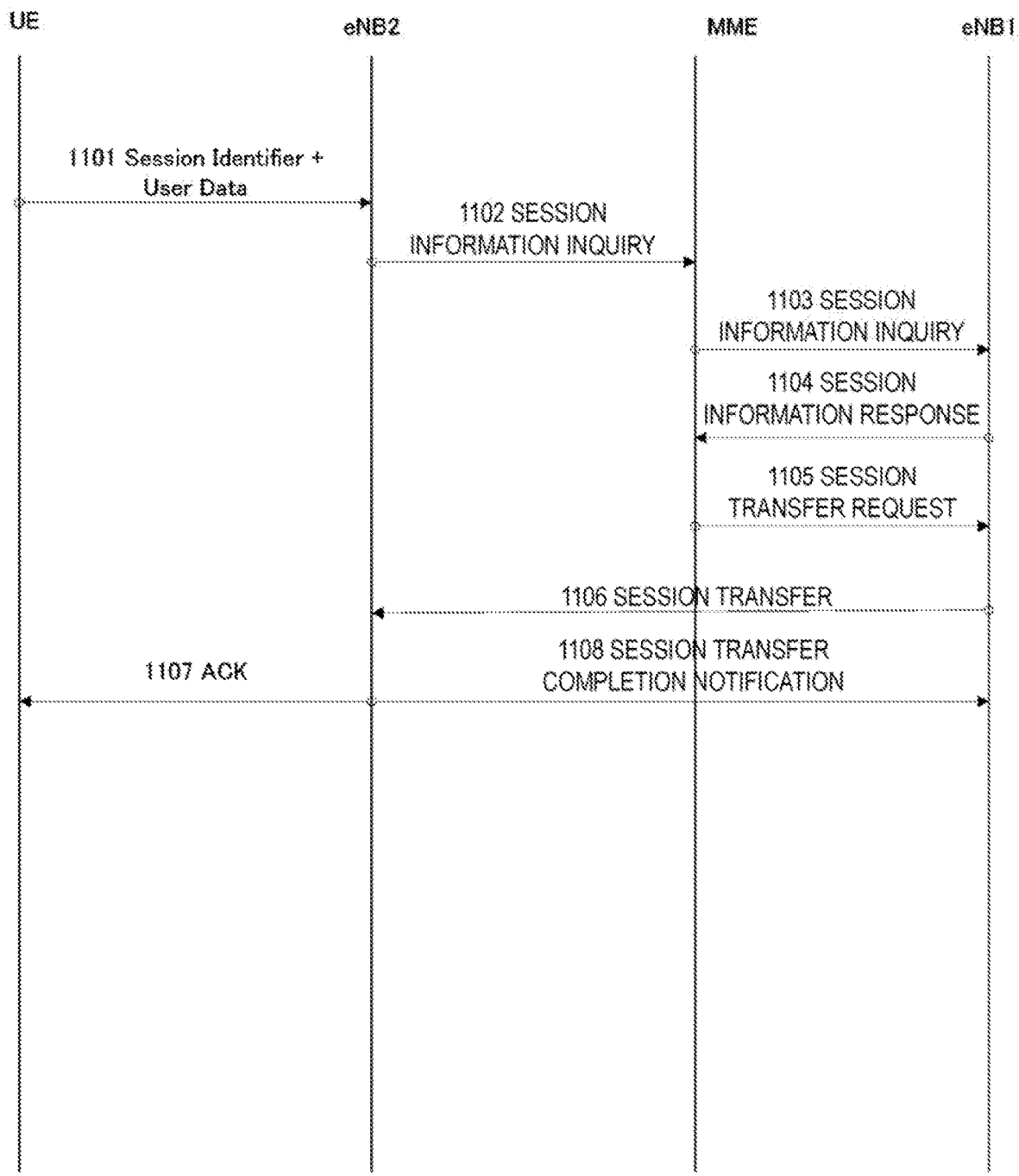
FIG. 10 is a diagram illustrating a flow of information according to an embodiment of the present invention.
Figure 11:
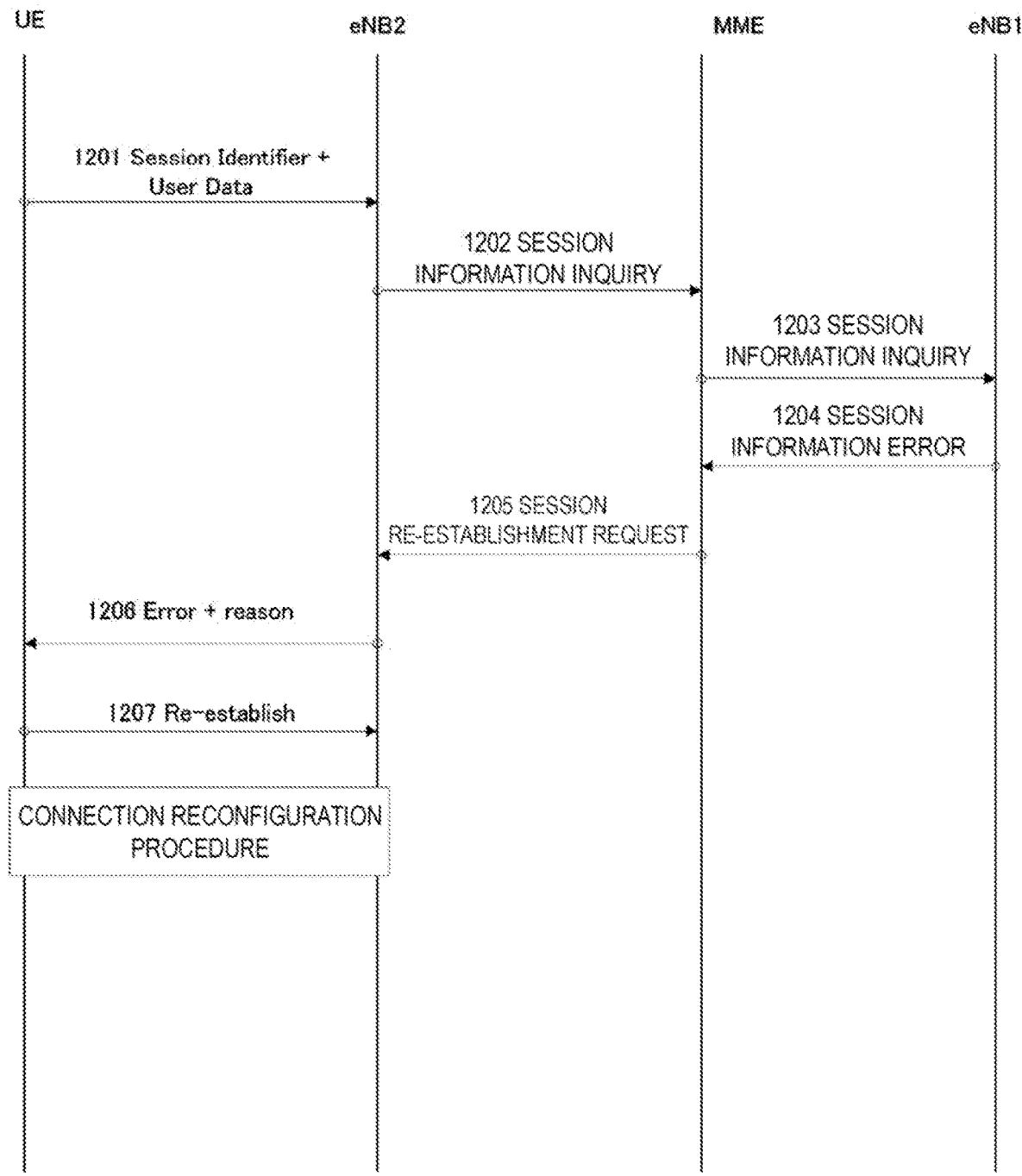
FIG. 11 is a diagram illustrating a flow of information according to an embodiment of the present invention.

Next, with reference to FIG. 10, a description will be made of a flow in which the radio terminal apparatus moves and switches the connection to the second radio base station apparatus. Once the radio terminal apparatus is ready to transmit the user data by using the grant-less communication scheme to the second radio base station apparatus, the radio terminal apparatus adds the session identifier to transmit the user data in the step 1101. Before transmitting the user data, the radio terminal apparatus may receive broadcast information transmitted by the second radio base station apparatus. The type of information to be received for transmitting the user data is not specified. For example, information described in NPL 1 may be received. Before transmission of the session identifier, it may be possible to refer to a certain piece of information included in the information broadcast by the radio base station apparatus, and determine whether the radio base station apparatus needs to be switched. Examples of reference information at this moment include a cell identifier, tracking area information, routing area information, a PLMN identifier, and the like, and it may be possible to determine the addition of the session identifier based on changes of values in these information. The second radio base station apparatus that receives the session identifier and the user data determines that the session identifier and the user data are received without error, and checks whether the received session identifier corresponds to the connection information that the second radio base station apparatus retains. In a case that there is no connection corresponding to the session identifier, in the step 1102, this session identifier is used to make an inquiry to the MME as to which radio base station apparatus, among the radio base station apparatuses managed by the MME, manages the connection corresponding to this session identifier. The MME, which receives this inquiry, checks the session information transmitted from one or more radio base station apparatuses managed by the MME and the session information registered in the MME to determine whether a session identifier included in the session information registered from a radio base station apparatus and another session identifier included in the inquiry at this time are identical to each other. In a case that the session information of which the session identifier is the same is found, an inquiry about the session information is made in the step 1103 to the radio base station apparatus 1 that has registered the session information to inquire whether a valid connection corresponding to the session identifier is retained. The radio base station apparatus 1, which receives the inquiry about the session information, checks whether the radio base station apparatus 1 retains the connection corresponding to the session identifier included in the inquiry, and notifies, as a session information response in the step 1104, the MME of whether the connection is retained. The MME, which receives the session information response, checks whether the session information response includes information that the radio base station apparatus that has responded to the inquiry about the session information retains the connection. In a case that the information is included, the MME performs, in the step 1105, a session transfer request for indicating to the radio base station apparatus 1 the transfer of the information, related to the connection corresponding to the session identifier, to the radio base station apparatus 2. The radio base station apparatus 1, which receives the session transfer request, transmits, in the step 1106, the information about the connection for which the session transfer request is made to the radio base station apparatus 2 as the session transfer information. The radio base station apparatus 2, which receives the session transfer information, checks whether the received session transfer information corresponds to the session inquiry information that the radio base station apparatus 2 has transmitted. In a case that the session transfer information corresponds to the session inquiry information, the radio base station apparatus 2 transmits, in the step 1108, a session transfer completion notification to the radio base station apparatus 1 that has transmitted the session information. Then, the radio base station apparatus 2 restores the connection with the radio terminal apparatus based on the received session information and, in the step 1107, transmits an ACK for the user data received in the step 1101. The radio terminal apparatus that receives the ACK determines that the transmission of the user data by using the grant-less communication scheme has been successfully performed, and completes the transmission procedure. The radio base station apparatus 2, which receives the session transfer notification, deletes the information about the transferred connection from the radio base station apparatus 2.

The information about the connection transferred between the radio base station apparatuses includes various information. The information, which is not particularly specified, may include, for example, the identifier of the radio terminal apparatus that performs the connection, the identifier for identifying this connection, data about the connection yet-to-be transmitted between the radio terminal apparatus and the radio base station apparatus, information about a key used for encrypting the connection or used for generating the key, and the like.

Next, the example of a case that a connection fails to switch between the radio base station apparatuses will be described with reference to FIG. 10. In the step 1201, the radio terminal apparatus transmits the user data together with the session identifier to the radio base station apparatus 2 by using the grant-less communication scheme. The radio base station apparatus 2 that receives the session identifier and the user data checks whether the radio base station apparatus 2 does not retain the connection corresponding to the received session identifier, and makes an inquiry in the step 1202 to the MME to inquire whether any other radio base station apparatuses retain the connection corresponding to this session identifier. The MME, which receives the inquiry, checks the session information registered in this MME and determines whether there is a radio base station apparatus that has registered the information about the connection corresponding to this session identifier. In a case that there is such a radio base station apparatus, a session inquiry, which is to make an inquiry to the radio base station apparatus, in this case, to the radio base station apparatus 1, is made in the step 1203 to inquire whether the radio base station apparatus 1 retains the connection corresponding to this session identifier. The radio base station apparatus 1, which receives the session inquiry, determines whether the radio base station apparatus 1 retains the connection corresponding to the session identifier based on the session identifier included in the inquiry. In this example, it is determined that the information about the retained connection has been discarded because a predetermined time has expired after the last communication between the radio base station apparatus and the radio terminal apparatus, for example. The processing is continued on the assumption that the connection corresponding to the session identifier is not retained. In a case that the information about the connection corresponding to this session identifier is not retained, the radio base station apparatus 1 notifies, in the step 1204, the MME of session information error for indicating that the information about the connection corresponding to this session identifier is not retained. Since the previous connection cannot be resumed, the MME, which is notified of the session information error, notifies, in the step 1205 to the radio base station apparatus 2 that has transmitted the session information inquiry, a session re-establishment request to prompt the radio terminal apparatus to reconfigure the connection. In the step 1206, the radio base station apparatus 2, which is notified of the session re-establishment request in response to the session information inquiry in the step 1202, notifies, to the radio terminal layer that has transmitted the session identifier and the user data in the step 1201, an error and information, as the reason of the error, that connection resumption has failed or a handover has failed, for example. At this moment, the user data that the radio base station apparatus 2 has received in the step 1201 may be discarded. The radio terminal apparatus that is notified of the error determines that the transmission of the user data performed in the step 1201 has failed, and activates a connection reconfiguration procedure in the step 1207. The radio terminal apparatus may retransmit the user data that has not been successfully transmitted after the connection reconfiguration procedure succeeds.

According to the procedure described above, the grant-less communication scheme used between the radio terminal apparatus and the radio base station apparatuses allows the radio terminal apparatus to change the radio base station apparatus to which the terminal apparatus is connected while retaining the current connection without a retransmission. In addition, in a case that the change of the radio terminal apparatus fails, the radio terminal apparatus is notified of the reason of the failure without making another request, and activates the connection resumption process, thus allowing the communication to be continued. In this manner, the radio base station apparatus, which is the connection destination of a radio terminal apparatus, can be changed without requesting radio resource assignment through the random access using the grant-based scheme.

Fourth Embodiment

Figure 12A:
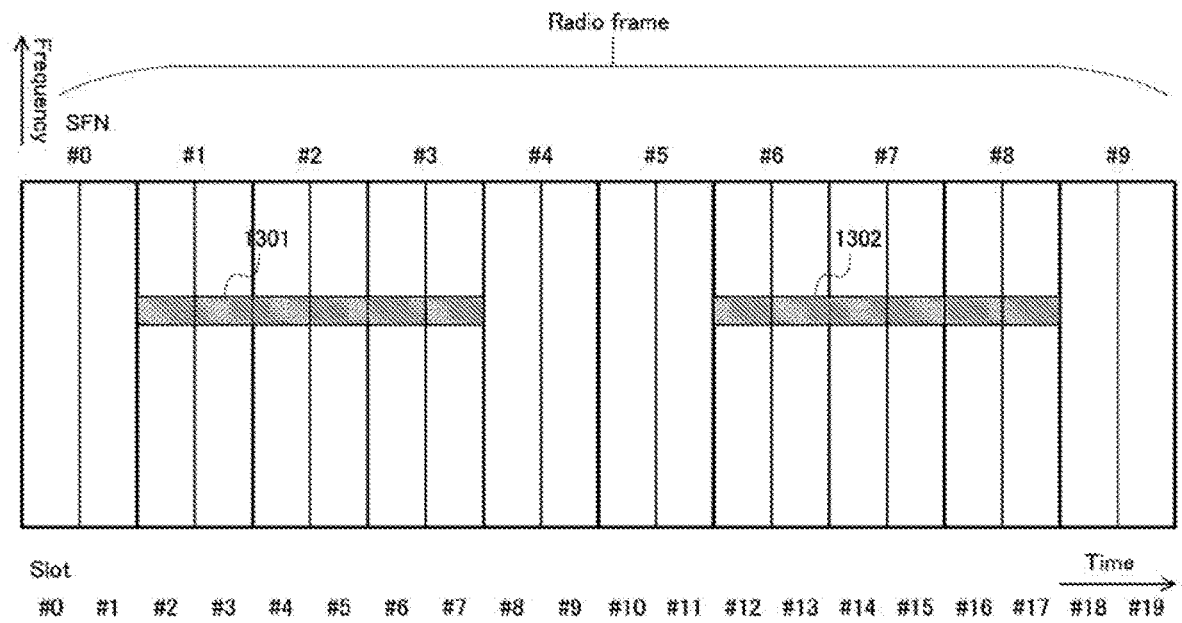
FIGS. 12A to 12C are diagrams illustrating structures of radio resources and signals used in an embodiment of the present invention.

The embodiment describes an example of a format of radio signals that can be used for transmission of the session identifier and the user data by using the grant-less communication scheme. In this example, a case is described where a random access channel typically used to transmit a random access signal is applied to perform a communication using the grant-less communication scheme. An overview of a radio frame used in the embodiment will now be described with reference to FIG. 12A. The radio frame is a management unit composed of a predetermined frequency band and a predetermined length of time. In a case that a Frequency Division Duplex (FDD) scheme is used for downlink signals from a radio base station apparatus to radio terminal apparatuses and uplink signals from the radio terminal apparatuses to the radio base station apparatus, the frequency bands of the downlink signals and the uplink signals are configured not to overlap with each other. FIG. 12A illustrates an overview of a radio frame used for the uplink signals at the time of using the FDD scheme. One radio frame is composed of ten subframes that are equally sized and numbered, in chronological order, from subframe #0 to subframe #9, the subframe #0 being the earliest subframe. Each subframe is composed of two equally sized slots, and these slots are also numbered, in chronological order, from slot #0 to slot #19, the slot #0 being the earliest slot. In many cases, a random access channel is configured to use one or more subframes in the radio frame and to use a part of the band in the subframes. Each radio terminal apparatus is informed of radio resources used by the random access channels through broadcast information broadcast by the radio base station apparatus. FIG. 12A illustrates an example where two random access channels are configured in one radio frame and three consecutive subframes constitute each random access channel. Reference sign 1301 represents a first random access channel using the subframes #1 to #3. Reference sign 1302 represents a second random access channel using the subframes #6 to #8. In a case that a radio terminal apparatus starts a random access procedure in the grant-based scheme, the radio terminal apparatus transmits a random access preamble to the random access channel. The random access preamble uses a signal based on a sequence selected from a plurality of predetermined sequences. In a case that the length of the sequence is shorter than the length of the signal of the random access preamble, the identical sequence may be repeatedly used to generate the signal of the random access preamble with a desired length. Various methods may be used to select the sequence, and a method may be used that narrows the range from which the sequence to be used is selected depending on the purpose of the random access. These sequences are designed such that, in a case that the radio base station apparatus receives a plurality of random access preambles based on a plurality of different sequences at the same time, the plurality of different sequences are individually identified. For example, the sequences described in NPL2 may be used.

Figure 12B:
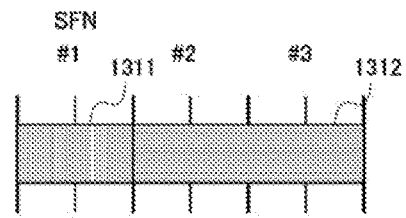

The random access channels used in the grant-based scheme is used for transmission in the grant-less communication scheme. FIG. 12B illustrates an example of a signal format used at this time. The signal is composed of two parts. A first part 1311 uses a signal format similar to the signal format of the random access preamble used in the grant-based scheme, and a subsequent part 1312 includes information to be transmitted by using the grant-less communication scheme. In the embodiment, the first subframe in the three subframes is referred to as the part 1311, and the remaining two subframes are referred to as the part 1312. The part 1311 may be used to be distinguished from the random access preamble used in the grant-based scheme. In a case that there are a plurality of radio terminal apparatuses that use the grant-less communication scheme, the part 1311 may be used to individually identify the radio terminal apparatuses. The sequence used in the part 1311 may be different from the sequence used in the random access preamble used in the grant-based scheme. Moreover, the sequence used in the part 1311 may be any one of sequences configured not to be used for the random access using the grant-based scheme by narrowing the selection range in a case of the random access using the grant-based scheme. This enables the radio base station apparatus that receives the part 1311 to determine that the received signal is transmitted using the grant-less communication scheme. In the embodiment, the length of the part 1311 corresponds to the length of one subframe. However, the part may have any length of time. For example, the length may correspond to the length of one slot or may be shorter than one slot. In a case that the length of the part 1311 is short, the length of the sequence used in the part 1311 may be shortened. The length of the part 1312 may not correspond to the length of two subframes, and may be any length so as to correspond to the available radio resources.

Figure 12C:
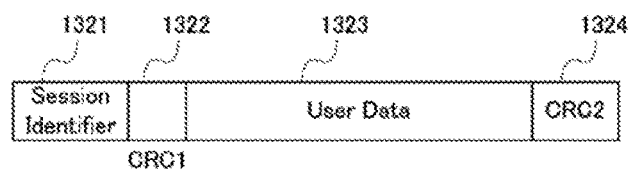

An example of information included in the part 1312 will be described with reference to FIG. 12C. The part 1312 includes a session identifier 1321 and user data 1323, and also includes a CRC 1.1322 for serving as information for detecting an error in receiving the session identifier 1321 and a CRC 2.1324 for serving as information for detecting an error in receiving the user data 1323. Various formats may be used for information for error detection, and, for example, Cyclic Redundancy Checksum (CRC) of the target information may be used. This enables the radio base station apparatus that receives the part 1312 to determine whether the radio base station apparatus has received the session identifier 1321 without an error even in a case that the entire part 1312 has not been demodulated. In a case that, for example, the length of the session identifier 1321 is shorter than the average length of the user data 1323, the capability to detect an error in receiving the session identifier 1321 may be lower than the capability to detect an error in receiving the user data 1323. In such a case, the amount of information (length of code) in the CRC 1.1322 may be configured to be less than the amount of information (length of code) in the CRC 2.1324. Note that the part 1312 may include information other than the session identifier 1321 and the user data 1323.

The performance of demodulating the session identifier 1321, of the session identifier 1321 and the user data 1323, may be increased to improve the terminal identification capability of the radio base station apparatus in a case that the signal using the grant-less communication scheme is received. This is because, in a case that the session identifier 1321 is associated with a connection used by a certain radio terminal apparatus, the radio terminal apparatus that has used the session identifier 1321 can be identified without using other information. Various methods may be used to increase the capability to demodulate the session identifier 1321. For example, as the modulation scheme for the session identifier 1321, or for the session identifier 1321 and the CRC 1.1322, the lowest-order modulation scheme that can be used as the modulation scheme for the user data 1323 may be used, or a lower-order modulation scheme, than compared with the modulation scheme used as the modulation scheme for the user data 1323, may be used. Moreover, in a case that an error correction code is used, the coding rate of the error correction code, used for the session identifier 1321 or for the session identifier 1321 and the CRC 1.1322, may be set to the lowest coding rate among the coding rates of the error correction code used for the user data 1323 or may be lower than the coding rates of the error correction code used for the user data 1323. Moreover, the transmit power for the session identifier 1321 or for the session identifier and the CRC 1.1322 may be configured to be larger than the transmit power for the user data 1323.

In a case that the random access channel used for the random access in the grant-based scheme are used in the grant-less communication scheme, the random access preamble in the grant-based scheme and the signal in the grant-less communication scheme may be received by the radio base station apparatus. In this case, it is preferable that the radio base station apparatus can detect both signals. Various methods are available, and a canceling technique, for example, may be used. In the canceling technique, a cross correlation is calculated for each of the sequences used for the random access preamble and the identification signal in the grant-less communication scheme in the part corresponding to the part 1311 in FIG. 12B, and all the sequences that are likely to be received in this part are estimated. Then, a replica of the random access preamble that is likely to be received is subtracted from the part corresponding to the part 1132 in FIG. 12B to try to demodulate the signal in the grant-less communication scheme by using the remaining signal. Methods other than the above-described method may also be used as the canceling method. The grant-less communication scheme and the grant-based scheme are efficiently used by detecting a plurality of random access preambles in the grant-based scheme, and simultaneously by detecting and demodulating one or more signals in the grant-less communication scheme.

The embodiment has described the transmission using the grant-less communication scheme by using the random access channels used for the random access in the grant-based scheme. However, radio resources other than the random access channels in the grant-based scheme may also be used. In a case that the band allocated to the random access channels in the grant-based scheme is too narrow to accommodate a sufficient amount of information that can be transmitted by using the grant-less communication scheme, other radio resources may be used. For example, a method in which semi-persistent radio resources described in NPL 1 are allocated for the grant-less communication scheme, another method in which a predetermined frequency band is used as radio resources for both the grant-less communication scheme and the grant-based scheme, or the like may be used. In a case that radio resources for the grant-less communication scheme are secured by allocating the semi-persistent radio resources, it may be possible to use a temporary radio network identifier for this purpose.

Programs operating in the apparatuses according to the present invention may be programs that control a Central Processing Units (CPU) or the like to cause a computer to function so as to achieve the functions of the embodiments according to the present invention. The program or information handled by the program is temporarily stored in a volatile memory such as Random Access Memory (RAM), a nonvolatile memory such as flash memory, a Hard Disk Drive (HDD), or any other storage device system.

It should be noted that the programs for achieving the functions of the embodiments according to the present invention may be recorded in a computer-readable storage medium. The functions may be achieved by causing a computer system to load and execute the program recorded in the storage medium. It is assumed that the "computer system" refers to a computer system built into the apparatus, and the computer system includes an operating system and hardware components such as a peripheral device. In addition, the term "computer-readable storage medium" may refer to a semiconductor storage medium, an optical storage medium, a magnetic storage medium, a medium dynamically retaining the programs for a short period of time, or any other computer-readable storage medium.

Moreover, functional blocks or features of the apparatuses used in the above-described embodiments may be implemented or performed by an electrical circuit, for example, an integrated circuit or a plurality of integrated circuits. The electrical circuit designed to perform the functions described in the present specification may include a general-purpose processor, a Digital Signal Processor (DSP), an Application Specific Integrated Circuit (ASIC), a Field Programmable Gate Array (FPGA), or any other programmable logic device, a discrete gate or transistor logic, discrete hardware components, or any combinations of these elements. The general purpose processor may be a microprocessor or may be a typical processor, a controller, a micro controller, or a state machine. The above-described electrical circuit may be composed of a digital circuit or may be composed of an analog circuit. In a case that integrated circuit technologies replacing the current integrated circuits emerge with advances in semiconductor technology, one or more aspects according to the present invention may use a new integrated circuit obtained through the technologies.

Note that the invention of the present patent application is not limited to the above-described embodiments. Although examples of apparatuses are described in the embodiments, the present invention is not limited to these apparatuses and is applicable to stationary or non-portable electronic devices installed indoors or outdoors including, for example, audiovisual equipment, kitchen appliance, cleaning and washing equipment, air conditioning equipment, office equipment, vending machines, and other terminal apparatuses or communication apparatuses such as household equipment.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention is applicable to a radio communication apparatus.

It should be noted that the present international application claims priority based on and claims priority from Japanese Patent Application Nos. 2016-129854, 2016-129855, and 2016-129856 filed on Jun. 30, 2016, and the entire contents of Japanese Patent Application Nos. 2016-129854, 2016-129855, and 2016-129856 are incorporated herein by reference.

REFERENCE SIGNS LIST 201 radio base station apparatus
202a to 202c radio terminal apparatus
301 controller
302 receiver
303 transmitter
304 receiving antenna unit
305 transmitting antenna unit
311 controller
312 receiver
313 transmitter
314 receiving antenna unit
315 transmitting antenna unit
401 radio base station apparatus 1
402 radio base station apparatus 2
403 core network
404 service area of radio base station apparatus 1
405 service area of radio base station apparatus 2
406 MME
407 radio terminal apparatus
1301, 1302 random access channel
1321 session identifier
1322 CRC 1
1323 user data
1324 CRC 2

The invention claimed is:

1. A radio terminal apparatus for communicating with a radio base station apparatus, the radio terminal apparatus comprising:
a transmitter configured to transmit a signal to the radio base station apparatus;
a receiver configured to receive a signal from the radio base station apparatus; and
a controller configured to control the transmitter and the receiver, wherein
the controller is capable of selecting both a grant-based scheme and a grant-less communication scheme to transmit user data,
in a case of transmitting the user data by using the grant-less communication scheme and adding a session identifier for identifying the radio terminal apparatus, a transmission of at least two parts that include a first part including the session identifier and a second part including the user data is performed at a time, first information for detecting an error in receiving the first part and second information for detecting an error in receiving the second part are added at the time of the transmission, regardless of the error in receiving the second part, and
an amount of the first information and an amount of the second information are different from each other;
wherein a coding rate of the first part is less than or equal to a minimum value of a coding rate used for coding the second part.

2. The radio terminal apparatus according to claim 1, wherein a modulation order of the first part is less than or equal to a minimum value of a modulation order used for modulating the second part.

3. The radio terminal apparatus according to claim 1, wherein
there are at least two states that include a connected state and an idle state,
a connection with the radio base station apparatus is temporarily halted to switch to the idle state,
in a case of resuming the connection from the idle state along with a transmission of the user data, the user data is transmitted by using the grant-less communication scheme, and
in a case of transmitting the user data, the session identifier is added and transmitted.

4. The radio terminal apparatus according to claim 3, wherein after the user data is transmitted, in a case of receiving a Non-Acknowledge (NACK) and radio resource allocation information from the radio base station apparatus, a radio resource indicated by the radio resource allocation information is used to retransmit the user data by using the grant-based scheme.

5. A radio base station apparatus for communicating with a radio terminal apparatus, the radio base station apparatus comprising:
a transmitter configured to transmit a signal to the radio terminal apparatus;
a receiver configured to receive a signal from the radio terminal apparatus; and
a controller configured to control the transmitter and the receiver, wherein
the controller is configured to receive, from the radio terminal apparatus, the signal in a grant-less communication scheme or the signal in a grant-based scheme,
the signal transmitted from the radio terminal apparatus in the grant-less communication scheme includes a first part including a session identifier for identifying the radio terminal apparatus and a second part including user data, and
in a case that an error in receiving the second part is detected and the first part is received without error, a radio resource to be used in the grant-based scheme is allocated to the radio terminal apparatus, and a Non-Acknowledge (NACK) and the radio resource allocated are transmitted to the radio terminal apparatus.

6. The radio base station apparatus according to claim 5, wherein in a case that the first part and the second part are received without error, regardless of whether a connection with the radio terminal apparatus is in a dormant state, an ACK for the user data is transmitted with the connection being in a connected state.

7. The radio base station apparatus according to claim 5, wherein in a case that the first part and the second part are received without error, a determination is made as to whether connections with the radio terminal apparatus managed by the radio base station apparatus include a connection corresponding to the session identifier included in the first part, and in a case that it is determined that the connection is not included, an inquiry is made, to a device that manages mobility of the radio terminal apparatus, about session information including the session identifier.

8. The radio base station apparatus according to claim 7, wherein after the inquiry about the session information is made to the device that manages the mobility of the radio terminal apparatus, in accordance with a session transfer request that is notified by the device that manages the mobility of the radio terminal apparatus, the connection corresponding to the session identifier is transferred to a radio base station apparatus indicated by the session transfer request.

9. The radio base station apparatus according to claim 8, wherein in a case of receiving a session transfer request from another radio base station apparatus, the connection with the radio terminal apparatus is resumed based on information included in the session transfer request, and an ACK for the user data is transmitted by using the connection resumed.

10. A radio transmission method for a radio terminal apparatus to communicate with a radio base station apparatus, the method comprising the steps of:

in a case that both a grant-based scheme and a grant-less communication scheme are selectable to transmit user data, in a case that the user data is transmitted by using the grant-less communication scheme, and a session identifier for identifying the radio terminal apparatus is added, transmitting at least two parts that includes a first part including the session identifier and a second part including the user data at a time; and adding first information for detecting an error in receiving the first part and second information for detecting an error in receiving the second part during the transmission, regardless of the error in receiving the second part, wherein an amount of the first information and an amount of the second information are different from each other;

wherein a coding rate of the first part is less than or equal to a minimum value of a coding rate used for coding the second part.

11. A radio communication method used in a radio base station apparatus that communicates with a radio terminal apparatus, the method comprising the steps of:

receiving, from the radio terminal apparatus, a signal in a grant-less communication scheme or a signal in a grant-based scheme;

in a case that the signal in the grant-less communication scheme transmitted from the radio terminal apparatus includes a first part including a session identifier for identifying the radio terminal apparatus and a second part including user data, in a case that an error in receiving the second part is detected, and the first part is received without error, allocating a radio resource used in the grant-based scheme to the radio terminal apparatus; and transmitting to the radio terminal apparatus a Non-Acknowledge (NACK) and the radio resource allocated.

* * * * *